United States Patent
Nelke et al.

(10) Patent No.: US 9,253,055 B2
(45) Date of Patent: *Feb. 2, 2016

(54) TRANSPARENTLY ENFORCING POLICIES IN HADOOP-STYLE PROCESSING INFRASTRUCTURES

(71) Applicant: International Business Machines Corporation, Armonk, NY (US)

(72) Inventors: Sebastian Nelke, Schoenaich (DE); Martin A. Oberhofer, Bondorf (DE); Yannick Saillet, Stuttgart (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/886,087

(22) Filed: May 2, 2013

(65) Prior Publication Data

US 2014/0108648 A1  Apr. 17, 2014

Related U.S. Application Data

(63) Continuation of application No. 13/649,709, filed on Oct. 11, 2012.

(51) Int. Cl.
  *G06F 15/173* (2006.01)
  *H04L 12/26* (2006.01)
  (Continued)

(52) U.S. Cl.
  CPC .............. *H04L 43/04* (2013.01); *G06F 9/5072* (2013.01); *H04L 41/5051* (2013.01); *H04L 41/5054* (2013.01)

(58) Field of Classification Search
  CPC ................ G06F 9/5083; G06F 9/4881; G06F 2209/5022; G06F 9/5044; G06F 11/3466
  USPC .......................................... 709/224; 718/100
  See application file for complete search history.

(56) References Cited

U.S. PATENT DOCUMENTS 7,657,586 B2  2/2010  Rodriguez et al.
8,150,889 B1  4/2012  Bacthavachalu et al.
(Continued)

FOREIGN PATENT DOCUMENTS

WO  2009055712 A1  4/2009
WO  2011034625 A1  3/2011

OTHER PUBLICATIONS

Antonio Corradi, Letizia Leonardi, Franco Zambonelli, Diffusive Load-Balancing Policies for Dynamic Applications, Jan.-Mar. 1999, IEEE Concurrency, vol. 7, pp. 22-31.*

(Continued)

*Primary Examiner* — June Sison
*Assistant Examiner* — Dixon Dabipi
(74) *Attorney, Agent, or Firm* — Patterson & Sheridan, LLP

(57) ABSTRACT

Method, system, and computer program product to facilitate selection of data nodes configured to satisfy a set of requirements for processing client data in a distributed computing environment by providing, for each data node of a plurality of data nodes in the distributed computing environment, nodal data describing the respective data node of the plurality of data nodes, receiving a request to process the client data, the client data being identified in the request, retrieving the set of requirements for processing the client data, and analyzing the retrieved data policy and the nodal data describing at least one of the data nodes, to select a first data node of the plurality of data nodes as a delegation target, the first data node selected based on having a higher suitability level for satisfying the set of requirements than a second data node of the plurality of data nodes.

9 Claims, 7 Drawing Sheets

(51) Int. Cl.
*H04L 12/24* (2006.01)
*G06F 9/50* (2006.01)

(56) References Cited

U.S. PATENT DOCUMENTS

| | | | |
|---|---|---|---|
| 8,700,773 B2* | 4/2014 | Caplan et al. | 709/225 |
| 2003/0069974 A1* | 4/2003 | Lu et al. | 709/226 |
| 2004/0162901 A1* | 8/2004 | Mangipudi et al. | 709/225 |
| 2005/0033809 A1* | 2/2005 | McCarthy et al. | 709/205 |
| 2007/0033250 A1 | 2/2007 | Levin et al. | |
| 2008/0183876 A1* | 7/2008 | Duvur et al. | 709/228 |
| 2009/0271412 A1 | 10/2009 | Lacapra et al. | |
| 2009/0299766 A1* | 12/2009 | Friedlander et al. | 705/3 |
| 2011/0041136 A1 | 2/2011 | Messier et al. | |
| 2011/0153606 A1 | 6/2011 | Kim et al. | |
| 2011/0167112 A1* | 7/2011 | Mazzucco et al. | 709/203 |
| 2011/0313973 A1 | 12/2011 | Srivas et al. | |
| 2012/0005345 A1 | 1/2012 | Doyle et al. | |
| 2014/0108639 A1 | 4/2014 | Nelke et al. | |

OTHER PUBLICATIONS

Lin, H.-C.; Dept. of Electr. Eng.-Syst., Univ. of Southern California, Los Angeles, CA, USA; Raghavendra, C.S., A dynamic load-balancing policy with a central job dispatcher (LBC), Aug. 6, 2002, Software Engineering, IEEE Transactions on (vol. 18, Issue: 2), pp. 148-158.*

Zomaya, A.Y.; Dept. of Electr. & Electron. Eng., Western Australia Univ., Nedlands, WA, Australia; Yee-Hwei Teh, Observations on using genetic algorithms for dynamic load-balancing, Aug. 7, 2002, IEEE, Parallel and Distributed Systems, IEEE Transactions on (vol. 12, Issue: 9), pp. 899-911.*

Nicolae, Bogdan et al., BlobSeer: Bringing High Throughput under Heavy to Hadoop Map/Reduce Applications, Proceedings of the 2010 IEEE International Symposium on Parallel & Distributed Processing, Feb. 2010, pp. 1-11, IEEE, New York, United States.

Luo, Yuan et al., A Hierarchical Framework for Cross-Domain MapReduce Execution, Proceedings of the second international workshop on Emerging computational methods for the life sciences, Jun. 2011, pp. 15-22, ACM, New York, United States.

Welcome to Apache Hadoop!, The Apache Software Foundation, Mar. 29, 2012, retrieved May 18, 2012. <http://hadoop.apache.org/>.

U.S. Appl. No. 13/649,709, entitled Transparently Enforcing Policies in Hadoop-Style Processing Infrastructures, filed Oct. 11, 2012.

* cited by examiner

TRANSPARENTLY ENFORCING POLICIES IN HADOOP-STYLE PROCESSING INFRASTRUCTURES

CROSS-REFERENCE TO RELATED APPLICATIONS

This application is a continuation of co-pending U.S. patent application Ser. No. 13/649,709, filed Oct. 11, 2012. The aforementioned related patent application is herein incorporated by reference in its entirety.

BACKGROUND

Embodiments disclosed herein relate to computer software which transparently enforces policies in distributed processing infrastructures.

Today, for large-scale data processing systems supporting cloud computing use cases, distributed file systems such as Hadoop have been proposed. While Hadoop-based systems provide distributed file system capabilities with a decentralized architecture allowing superior levels of business resiliency even if entire racks of server and storage systems become unavailable due to network connectivity loss, hardware failure, or a disaster, Hadoop solutions (and distributed computing solutions in general) are unable to support policy-driven service level agreements for external customers in a transparent manner.

Hadoop is a software framework that supports data-intensive distributed applications. Hadoop enables applications to work with thousands of computational independent computers and petabytes of data. The Hadoop distributed file system (HDFS) is a distributed, scalable, and portable filesystem for the Hadoop framework. A large Hadoop cluster may include a dedicated name node which hosts a filesystem index to manage the HDFS, as well as multiple data nodes which may store data and perform operations on the data. Today, Hadoop and other distributed processing infrastructures assume that all data nodes in their systems have the same characteristics. (Hadoop is a trademark of the Apache Software Foundation.)

SUMMARY

Embodiments disclosed herein provide a computer-implemented method, a system, and a computer program product to facilitate selection of data nodes configured to satisfy a set of requirements for processing client data in a distributed computing environment by providing, for each data node of a plurality of data nodes in the distributed computing environment, nodal data describing the respective data node of the plurality of data nodes, receiving a request to process the client data, the client data being identified in the request, retrieving the set of requirements for processing the client data identified in the request, and analyzing the retrieved data policy and the nodal data describing at least one of the data nodes, to select a first data node of the plurality of data nodes as a delegation target, the first data node being selected based on having a higher suitability level for satisfying the set of requirements than a second data node of the plurality of data nodes.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
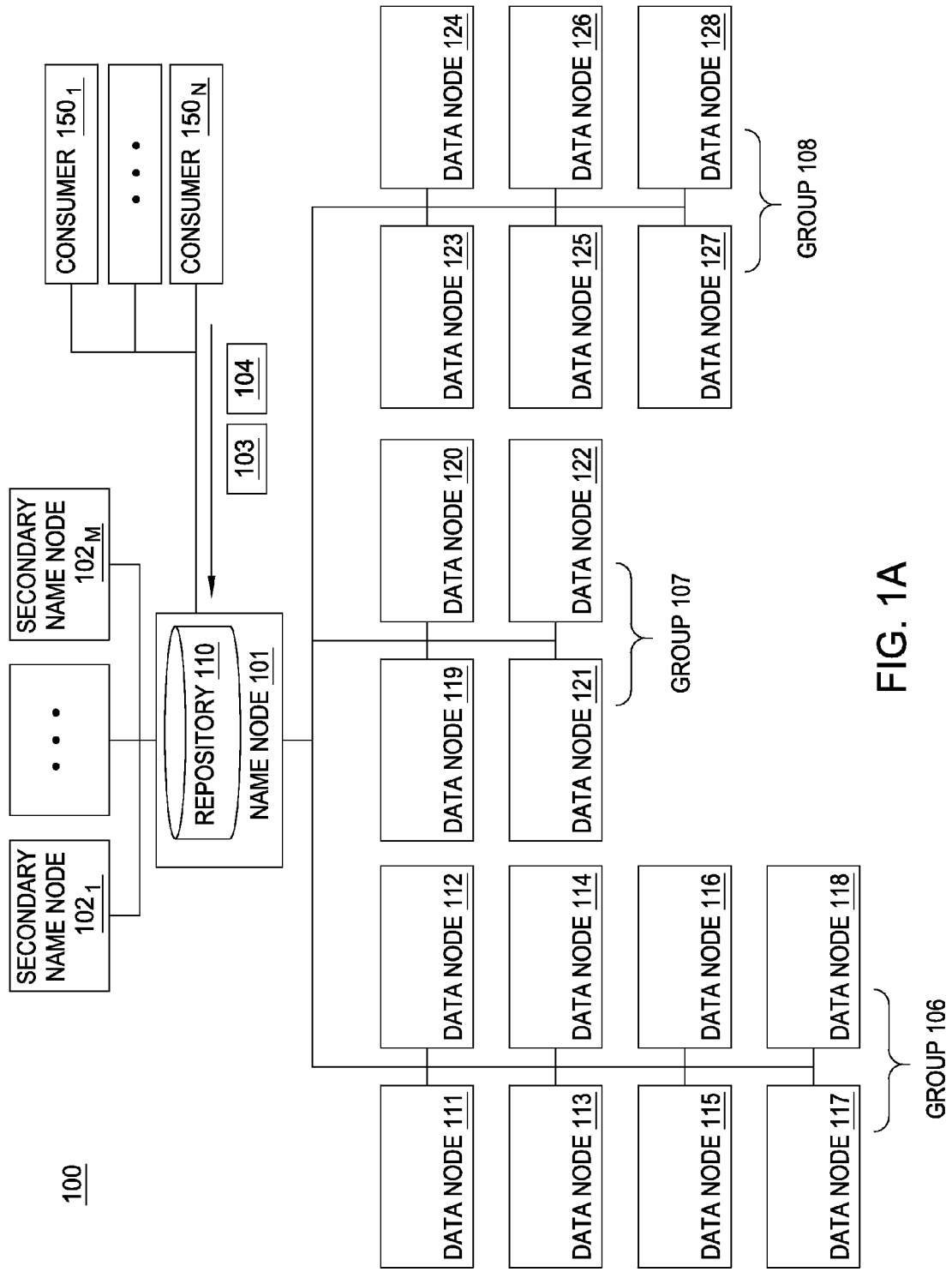
FIGS. 1A-1B are block diagrams illustrating a schematic to transparently enforce policies in distributed processing infrastructures, according to one embodiment disclosed herein.

Embodiments generally provide techniques to facilitate selection of data nodes configured to satisfy a set of requirements for processing client data in a distributed computing environment. Embodiments may provide, for each data node of a plurality of data nodes in the distributed computing environment, nodal data describing the respective data node of the plurality of data nodes. A request to process the client data may be received, the client data being identified in the request. Additionally, embodiments may retrieve the set of requirements for processing the client data identified in the request, and may analyze the retrieved data policy and the nodal data describing at least one of the data nodes, to select a first data node of the plurality of data nodes as a delegation target. Here, the first data node could be selected based on having a higher suitability level for satisfying the set of requirements than a second data node of the plurality of data nodes.

Although embodiments disclosed herein use the Hadoop data storage framework as a representative example, embodiments are not limited to the Hadoop framework. Rather, it is broadly contemplated that embodiments can be extended all types of distributed file systems, known or unknown. Embodiments disclosed herein provide a dynamic cloud infrastructure by improving capabilities of a name node to assemble "sub-clouds" from the total set of all data nodes with different characteristics expressed in metadata based on need. Furthermore, embodiments provide enhanced metadata describing the data nodes, which are not considered equal in light of privacy policies, security policies, retention policies, and disaster recovery policies. For example, embodiments provide different types of data nodes supporting different functional and non-functional policies for the end consumer. In such an embodiment, only the name node may have the metadata necessary to distinguish between the different data node types, and may dynamically select which data nodes are used for a particular task. Additionally, the name nodes could utilize technical metadata describing different characteristics of the data nodes, such as computing power, storage size, network bandwidth, location, etc., in order to select the most appropriate data nodes to complete a computing task. As used herein, "nodal data" includes the metadata which describes the characteristics of each data node in the infrastructure.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access crowd sourcing applications or related data available in the cloud. For example, the data exception emitter could execute on a computing system in the cloud and emit data quality exceptions. In such a case, the crowd sourcing manager could receive the exception and store details related to the exception at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. A node in a cloud computing network is a computing device, including, but not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. A cloud computing node is capable of being implemented and/or performing any of the functionality set forth hereinabove.

FIG. 1A is a block diagram illustrating a schematic 100 to transparently enforce policies in distributed processing infrastructures, according to one embodiment disclosed herein. The schematic 100 depicts a distributed processing infrastructure, which, in one embodiment, is a Hadoop infrastructure. A name node 101 orchestrates the overall infrastructure. The name node 101 is responsible for receiving tasks from external consumers $150_{1-N}$ and delegating the tasks to at least one of a plurality of data nodes, which in the schematic 100, include data nodes 111-128. The information stored on the name node 101 is encrypted. The consumers $150_{1-N}$ are the systems using the service provided by the infrastructure orchestrated through the name node 101 by subscribing to the service. The consumers $150_{1-N}$, when subscribing to the service, provide a service level agreement (SLA) and associated policies.

The name node 101 also includes a repository 110, which is configured to hold at least two distinct types of data—data node metadata and policy metadata. Data node metadata describes the characteristics of each data node in the infrastructure, which may include, but is not limited to: (i) security related attributes, such as privacy settings, encryption settings, retention settings, etc., (ii) technical attributes, such as CPU, memory, and storage capabilities, (iii) geographical information, such as physical location (address), and any applicable laws and regulations for the country or region (e.g., European Union), (iv) organizational information such as corporation, business unit, owner of the hardware infrastructure (e.g., in private cloud environments, computing equipment might be funded by different business unites, and sharing of it across major business unit boundaries may or may not be permissible), (v) administrator contact details, (vi) data node resource utilization, and (vii) use case metadata, such as whether the data node may be used for disaster recovery use cases. In some embodiments, the name node may retrieve the data node metadata, or an administrator may enter the data node metadata.

Policies (and their metadata) stored in the repository 110 are provided by consumers. Once a subscription for the service is made, the name node must persist the policy (or policies) with additional information on how the SLA and policies are deployed. The name node must therefore know which data nodes have been selected to fulfill the service subscription and why they have been selected. The policies may specify different requirements, including, but not limited to: (i) a data volume requirement, (ii) security and privacy aspects of the data (for example, it may be permissible to have transactional business object data like marketing campaign information on any data node, whereas master data business objects like sales employee information might only be permitted on data nodes fulfilling certain security and privacy requirements), (iii) redundancy requirements, (iv) disaster recovery (e.g., minimal distance of data nodes for scope of different types of disasters), and (v) legal requirements (e.g., certain regulations demand that data does not cross country borders, therefore requiring knowledge of where the data nodes are physically located). In some embodiments, the policy may be received with the service request, but may not need to be stored in the repository 110. For example, the policy related to a one-time service request may or may not be stored in the repository 110.

As shown, a plurality of secondary name nodes $102_{1-M}$ provide redundancy and disaster recovery solutions for the name node 101, which is a single point of failure for the overall infrastructure. There may be one or multiple secondary name nodes $102_{1-M}$ depending on the particular requirements of the deployment. The secondary name nodes $102_{1-M}$ communicate with the name node 101 over a secure connection.

The data nodes 111-128 are used for algorithmic and data processing. As shown, the data nodes are grouped into three different types, namely groups 106-108. The data nodes may be grouped based on any number of attributes, including but not limited to geography, organization, hardware attributes. In any implementation there may be any number of different data node types, with any number of each type of data node. Additionally, the data nodes may be configured so that the individual data nodes do not contain information identifying the other data nodes in the cloud. Such an embodiment may be advantageous, for instance, in case a data node is hacked by a malicious party. In such a situation, it would not be possible for the malicious party to use metadata stored on the hacked data node to find out which other data nodes belong to the same cloud.

As shown, two example datasets 103 and 104 have been sent to the name node 101 for processing pursuant to a subscription and the attached policies provided by one of the consumers $150_{1-N}$. Once received, the name node 101 must determine whether one (or more) of the data nodes 111-128 are suitable for handling the processing and storage of the datasets 103-104. In making this determination, the name node 101 reads the data node metadata from the repository 110, parses the policies, and retrieves data node utilization figures. The name node 101 then determines whether current (and future) data node utilization allows for sufficient free capacity to accommodate the new workload. If there is not sufficient capacity, the name node 101 rejects the new workload. If sufficient capacity exists, the name node 101 determines whether the policies can be fulfilled considering the details in an implementation strategy it devises. If the policies cannot be fulfilled, the name node 101 rejects the new workload. If the policies can be fulfilled, the name node 101 computes the physical layout of the workload on the data nodes 111-128 based on hardware characteristics of the data nodes, performance attributes, availability of the data nodes, and disaster recovery requirements. In some embodiments, the name node 101 may assign a suitability score for each data node 111-128, which incorporates the ability to fulfill policy requirements and the above-mentioned attributes of the data nodes. If a possible layout is determined, the name node 101 accepts the workloads of datasets 103-104.

Figure 1B:
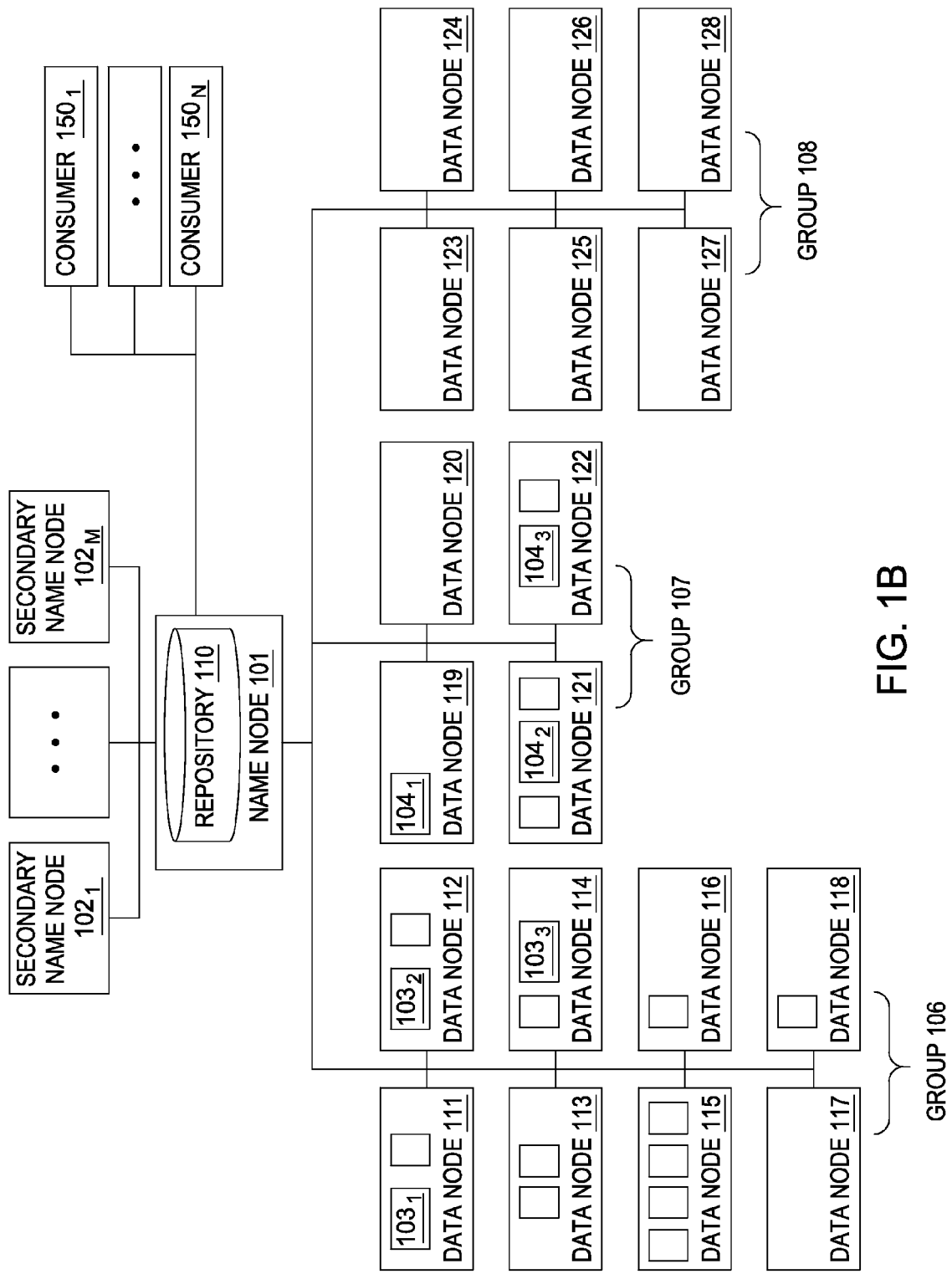

FIG. 1B is a block diagram illustrating the deployed workload of datasets 103-104 after acceptance by the name node 101. As shown, the name node 101 has partitioned the datasets 103-104 into three distinct portions each for processing. Data node 111 has portion $103_1$, data node 112 has portion $103_2$, and data node 114 has portion $103_3$. As shown, each portion of dataset 103 has been deployed to a data node in group 106. The name node 101 may have made this determination on any number of factors, based on the metadata of each data node and the policy requirements in the repository 101. The nodes of the group 106 may have been determined because they are located in a state (e.g., North Carolina) in which the policy mandates the dataset 103 must reside. The nodes 111, 112, and 114 may have been selected because they had lower resource utilizations (and therefore higher suitability scores) than the other nodes. The free blocks on the compute nodes indicate that the data nodes may be able to process data for other subscribers (and may currently be processing such data).

As shown, each portion of dataset 104 has been deployed to data nodes in group 107. Data node 119 has portion $104_1$, data node 121 has portion $104_2$, and data node 122 has portion $104_3$. Each portion of dataset 103 has been deployed to a data node in group 107. The name node 101 may have made this determination on any number of factors, based on the metadata of each data node and the policy requirements in the repository 101. For example, the dataset 104 might have sensitive data which may only be protected by the nodes of group 107. Alternatively, the nodes of group 107 may have been chosen by the name node 101 because they are owned by the consumer owning the dataset 104, and the policy mandates that the dataset 104 be processed and stored on the consumer's resources. The nodes 119, 121, and 122 may have been selected because they had lower resource utilizations (and therefore higher suitability scores) than the other nodes. It should be noted that although each of portion the datasets 103 and 104 were deployed to the same group, under appropriate circumstances, the portions may be distributed among data nodes of different groups.

Upon accepting and deploying the workload, the name node 101 then updates the metadata in the repository 110 regarding the processing tasks on each data node receiving new workload. The configuration depicted FIG. 1B is the result of the name node 101 creating a dynamic cloud infrastructure with placement of data onto data nodes which are compliant with all relevant policies. The data nodes selected are also the best suited for the workload in light of resource utilization of the data nodes. Therefore, embodiments disclosed herein provide an infrastructure where the data nodes are not equal due to their varying attributes, as discussed above. The metadata corresponding to these attributes is utilized by the name node 101 to make decisions on whether to accept workloads, and how to deploy the workloads.

Figure 2:
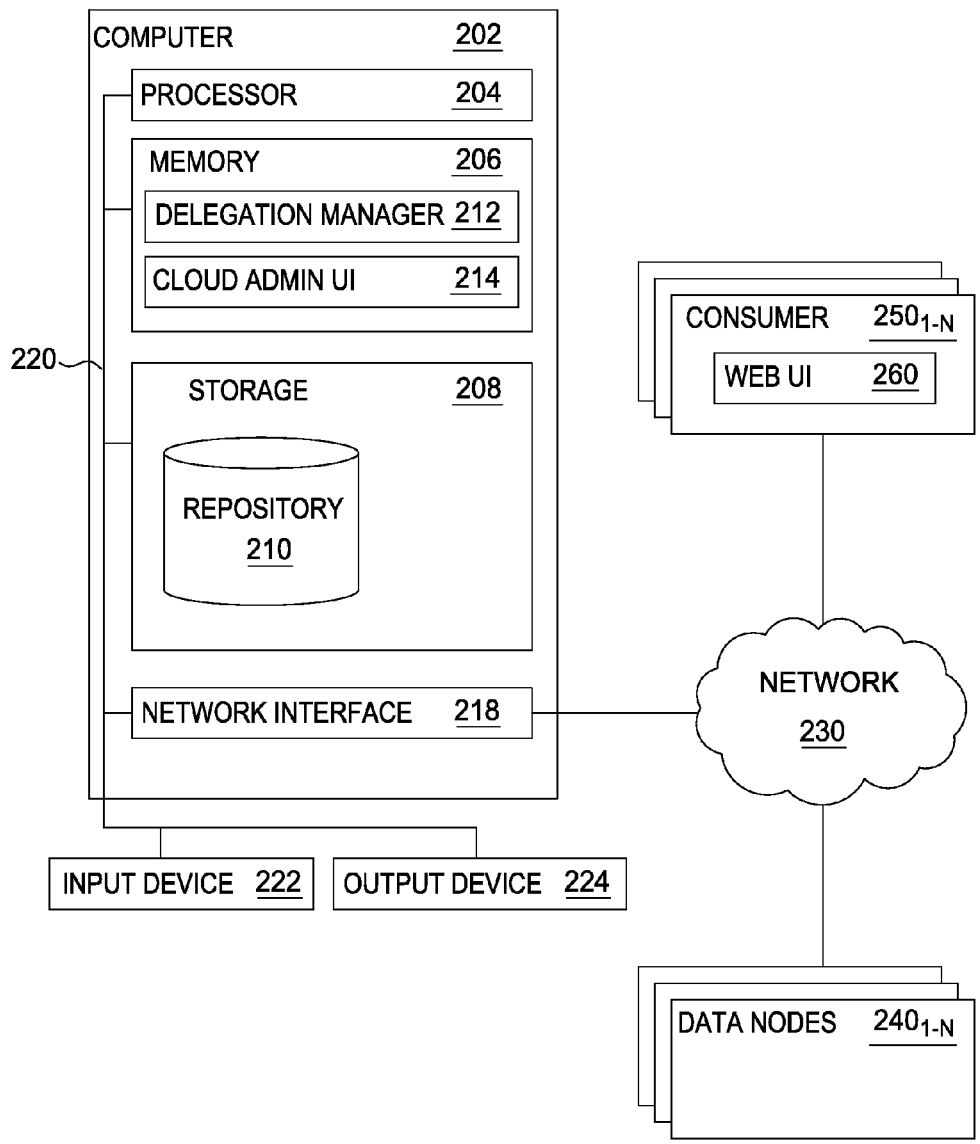
FIG. 2 is a block diagram illustrating a system for transparently enforcing policies in distributed processing infrastructures.

FIG. 2 is a block diagram illustrating a system 200 to transparently enforce policies in distributed processing infrastructures. The system 200 includes a computer 202. In one embodiment, the computer 202 is the name node 101 of FIG. 1. The computer 202 may also be connected to other computers via a network 230. The computer 202 may also be connected to several backup computers for failover and disaster recovery purposes (not shown). In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 206 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, floppy disc drives, tape drives, removable memory cards or optical storage. The memory 206 and the storage 208 may be part of one virtual address space spanning multiple primary and secondary storage devices.

As shown, the memory 206 contains the delegation manager 212, which is an application generally configured to perform the functionality of the name node 101 described in FIG. 1. The delegation manager 212 stores metadata regarding a plurality of data nodes $240_{1-N}$ in the repository 210. The metadata of the data nodes $240_{1-N}$ describes characteristics of the data nodes $240_{1-N}$, including, but not limited to: (i) security related attributes, such as privacy settings, encryption settings, retention settings, etc., (ii) technical attributes, such as CPU, memory, and storage capabilities, (iii) geographical information, such as physical location (address), applicable laws and regulations for each country or region (e.g., European Union), (iv) organizational information such as corporation, business unit, owner of the hardware infrastructure (e.g., in private cloud environments, computing equipment might be funded by different business unites, and sharing of it across major business unit boundaries may or may not be permissible), (v) administrator contact details, (vi) data node resource utilization, and (vii) use case metadata, such as whether the data node may be used for disaster recovery use cases.

The delegation manager 212 may receive service requests from a plurality of consumers $250_{1-N}$. The requests include service level agreements (SLA) and policies, which are stored in the repository 210. The policies may specify different requirements, including, but not limited to: (i) a data volume requirement, (ii) security and privacy aspects of the data (for example, it may be permissible to have transactional business object data like marketing campaign information on any data node, whereas master data business objects like sales employee information might only be permitted on data nodes fulfilling certain security and privacy requirements), (iii) redundancy requirements, (iv) disaster recovery (e.g., minimal distance of data nodes for scope of different types of disasters), and (v) legal requirements (e.g., certain regulations demand that data does not cross country borders, therefore requiring knowledge of where the data nodes are physically located). Upon receiving a service request, the delegation manager 212 makes a determination as to whether the request can be fulfilled in light of the current workload on the data nodes $240_{1-N}$ by retrieving metadata related to the workload capacity of each data node $240_{1-N}$. If sufficient capacity exists, the delegation manager 212 determines whether the request's policies and SLA can be fulfilled in light of the metadata of each data node $240_{1-N}$. If the policies and SLA can be fulfilled, the delegation manager 212 may partition the workload into discrete tasks for deployment to a select number of data nodes $240_{1-N}$, where they are processed and/or stored.

As shown, the memory 206 also contains the cloud admin UI 214. The cloud admin UI 214 is an application which provides a user interface for administrators configuring and maintaining the infrastructure operated through the name node (computer 202).

As shown, the storage 208 contains the repository 210, which stores metadata related to data nodes $240_{1-N}$, metadata related to consumer policies, and service level agreements. Although depicted as a database, the repository 210 may take any form sufficient to store data, including text files, xml data files, and the like. Although depicted as part of the computer 202, the repository 210 may be stored in a system external to the computer 202.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

Figure 3:
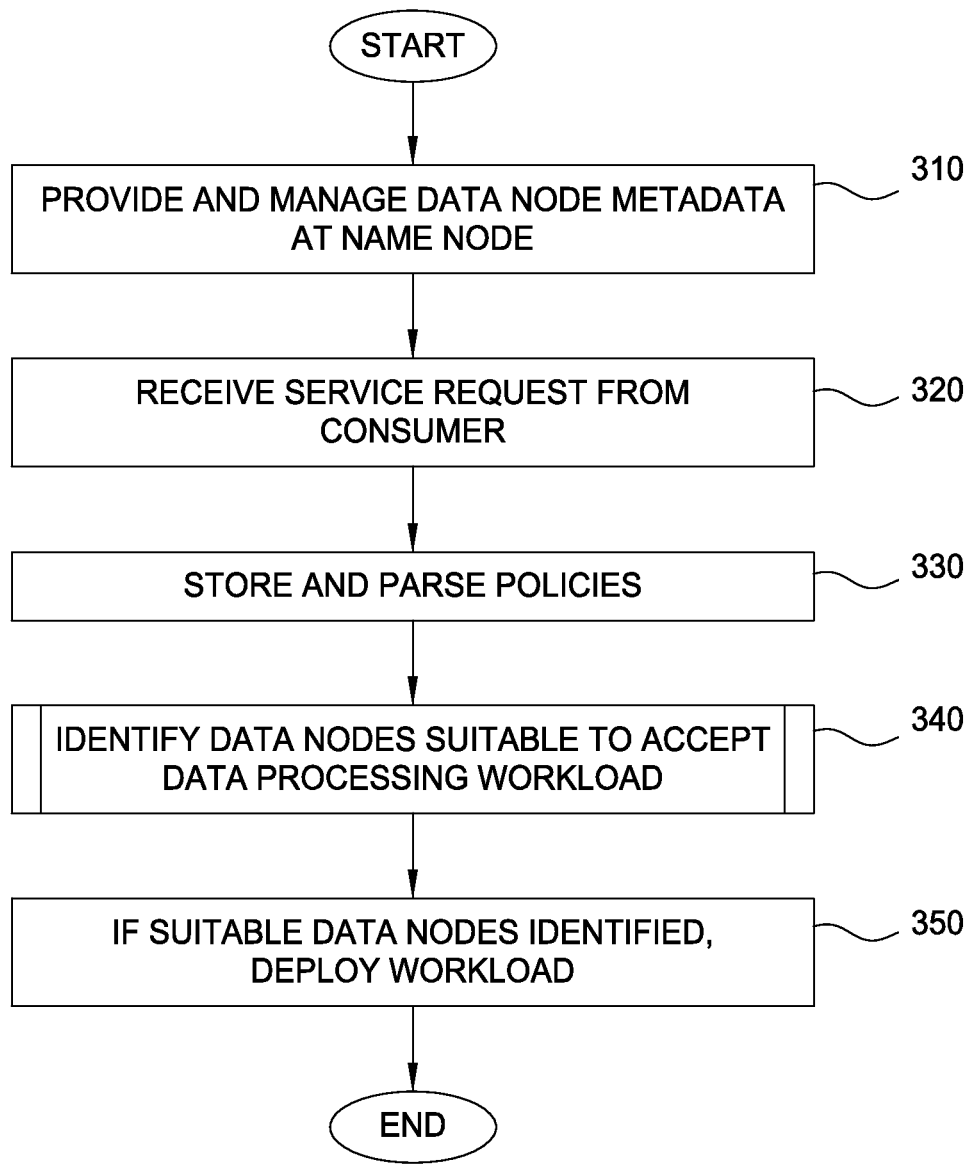
FIG. 3 is a flow chart illustrating a method to transparently enforce policies in distributed processing infrastructures, according to one embodiment disclosed herein.

FIG. 3 is a flow chart illustrating a method 300 to transparently enforce policies in distributed processing infrastructures, according to one embodiment disclosed herein. In one embodiment, the distributing processing infrastructure is a Hadoop processing infrastructure having a name node and a plurality of data nodes, as described above, and the steps of the method 300 may be performed by the delegation manager 212. At step 310, the delegation manager 212 provides and manages data node metadata at the name node. Described in greater detail above, the data node metadata generally describes characteristics of each data node in the computing infrastructure. At step 320, the delegation manager 212 receives a service request from a consumer. Exemplary services provided include, but are not limited to, data analysis tasks such as data profiling, data aggregation, data transformation, search for duplicate records, and search for a compound unique key. Any type of analysis which can be executed in parallel in a distributed environment may be provided. The service request may generally include a service level agreement and policies specifying a number of different requirements, which may relate to data volume requirements, security/privacy requirements, redundancy requirements for affected service availability, disaster recovery requirements, and legal requirements. At step 330, the delegation manager 212 may store the policy metadata in the repository 210, and may parse the policy to determine the consumer's exact requirements in light of the request. At step 340, the delegation manager 212 may identify data nodes suitable to accept the requested data processing workload. The delegation manager 212 may identify suitable data nodes based on data node metadata and the policy metadata. At step 350, if the delegation manager 212 identifies suitable data nodes, the workload is deployed.

Figure 4:
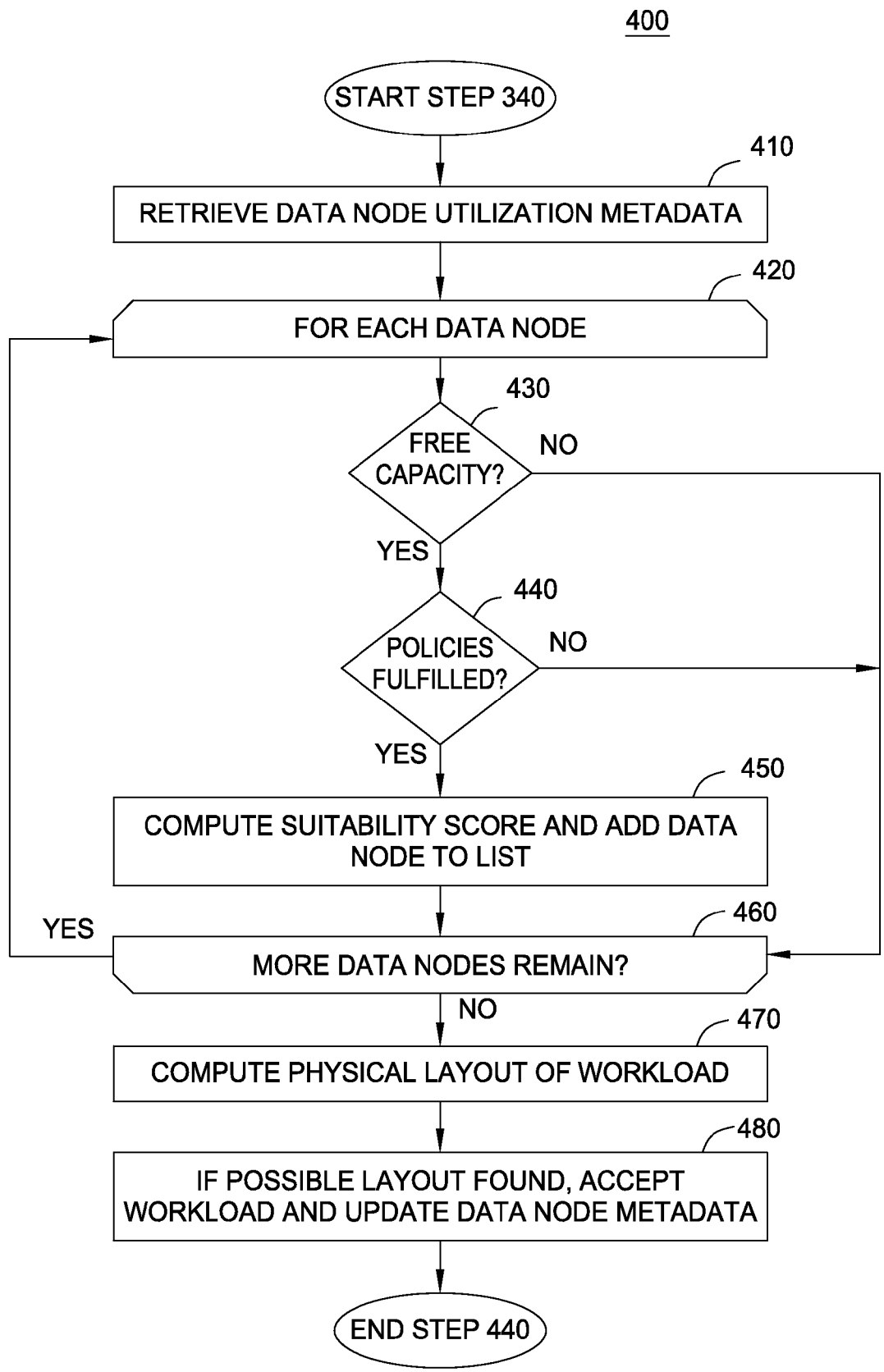
FIG. 4 is a flow chart illustrating a method for identifying data nodes suitable to accept a data processing workload, according to one embodiment disclosed herein.

FIG. 4 is a flow chart illustrating a method 400 corresponding to step 340 for identifying data nodes suitable to accept a data processing workload, according to one embodiment disclosed herein. In some embodiments, the delegation manager 212 performs the steps of the method 400. At step 400, the delegation manager 212 retrieves the data node utilization metadata for each data node in the computing infrastructure. In some embodiments, the data node utilization metadata is stored in the repository 210. The data node utilization metadata may contain information including, but not limited to, current (and scheduled) workload for the data node, including a number of tasks to be completed, current resource utilization (such as CPU, memory, and storage capacity) of the data node, and expected resource utilization in completing scheduled tasks.

At step 420, the delegation manager begins executing a loop including steps 430-460 for each data node in the computing infrastructure. At step 430, the delegation manager 212 determines, based on the data node utilization metadata, whether the data node has sufficient free capacity to accept at least a portion of the workload. In some embodiments, the delegation manager 212 may compute a utilization score based on the current workload of the data node to determine a utilization level. The delegation manager 212 may then compare the utilization score to a predefined maximum utilization threshold. If the utilization score is lower than the threshold, the data node is considered as having sufficient free capacity to accept a new workload. If the data node does not have sufficient free capacity, the delegation manager 212 proceeds to step 460. If the data node has sufficient free capacity, the delegation manager 212 proceeds to step 440, where it determines whether the data node can fulfill each aspect of the consumer's policy. For example, a consumer located in the European Union may require that personal information must be protected from loss, unauthorized disclosure, and modification while the data is in transit or at rest. Therefore, the delegation manager 212 may determine whether the data node can meet these requirements. If the data node cannot fulfill these requirements, the delegation manager 212 proceeds to step 460. Otherwise, the delegation manager 212 proceeds to step 450. At step 450, the delegation manager 212 computes a suitability score for the data node and adds the data node to a list of candidate data nodes. The suitability score may be based on the metadata attributes of the data node, ability to fulfill policy requirements, and available capacity. Any suitable scoring range and any method for assigning a score may be implemented. At step 460, the delegation manager 212 determines whether more data nodes remain to be scored. If more data nodes remain, the delegation manager 212 returns to step 420. Otherwise, the delegation manager 212 proceeds to step 470.

At step 470, the delegation manager 212 computes the physical layout of the workload to determine whether a possible layout to distribute the workload exists. At this step, the delegation manager 212 may consider each data node on the candidate list, and assign portions of the workload to the data nodes having the highest suitability scores. For example, the data node with the highest suitability score may be selected over the data node with the second highest suitability score. If additional data nodes need to be selected because the workload cannot be accommodated by a single data node, the data node with the second highest suitability score may be selected, although another node having a sufficient suitability score may be selected. At step 480, if a possible layout is found, the delegation manager 212 accepts the workload and updates the data node metadata to reflect the newly assigned workloads.

In the event that an attribute of a data node is not populated in the name node metadata, the delegation manager 212 may take different courses of action based on the nature of the attribute. If the attribute is security related, the data node is marked as not fulfilling the security requirement and is excluded from the candidate list of data nodes (or not added to the list to begin with) to avoid potential security issues. For example, if the cloud administrator does not want to specify all attributes for all data nodes, this approach prevents the situation where a data node is added with manipulated metadata. If the attribute is not security related, however, the data node might be selected if there is no other data node available which explicitly fulfils the requirement.

Additionally, the consumer policies can be variable, following a workflow approach. For example, the policy may be constant over time, less strict on subsequent processing steps, or stricter on subsequent processing steps. In these scenarios, the name node can build the cloud for each processing step based on the policy applicable for each processing step. If there are advanced security requirements, the name node might enforce a policy that a data node with sensitive data may only be part of one cloud.

Advantageously, embodiments provide a dynamic orchestration of cloud computing infrastructure through the name node of the infrastructure. Additionally, embodiments provide support for consumer policies, providing solutions for different requirements, such as: (i) data privacy, (ii) data security, (iii) disaster recovery, (iv) performance, and (v) infrastructure sharing. Embodiments also provide autonomic features in the HDFS infrastructure for policy support.

Figure 5:
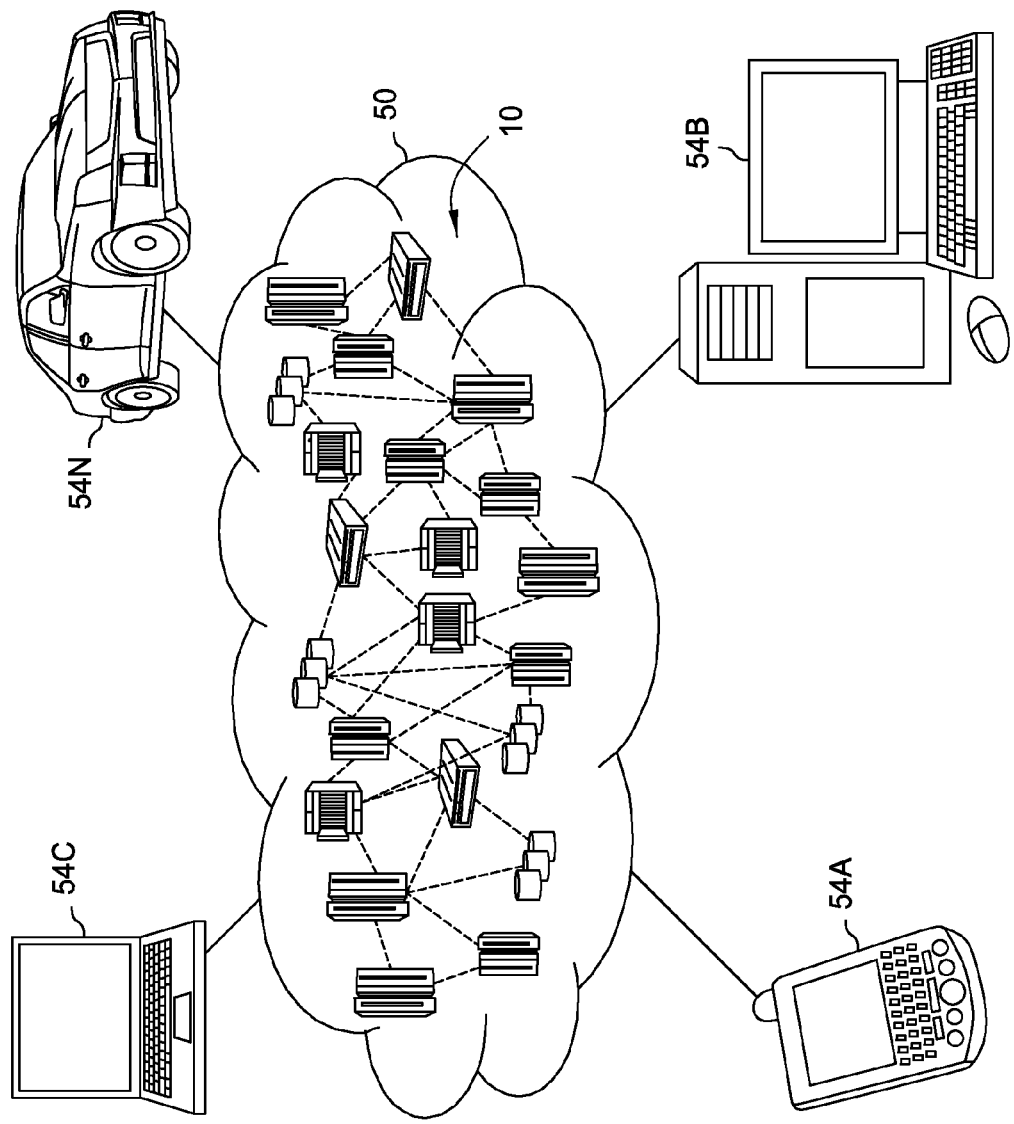
FIG. 5 depicts a cloud computing environment, according to one embodiment disclosed herein.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
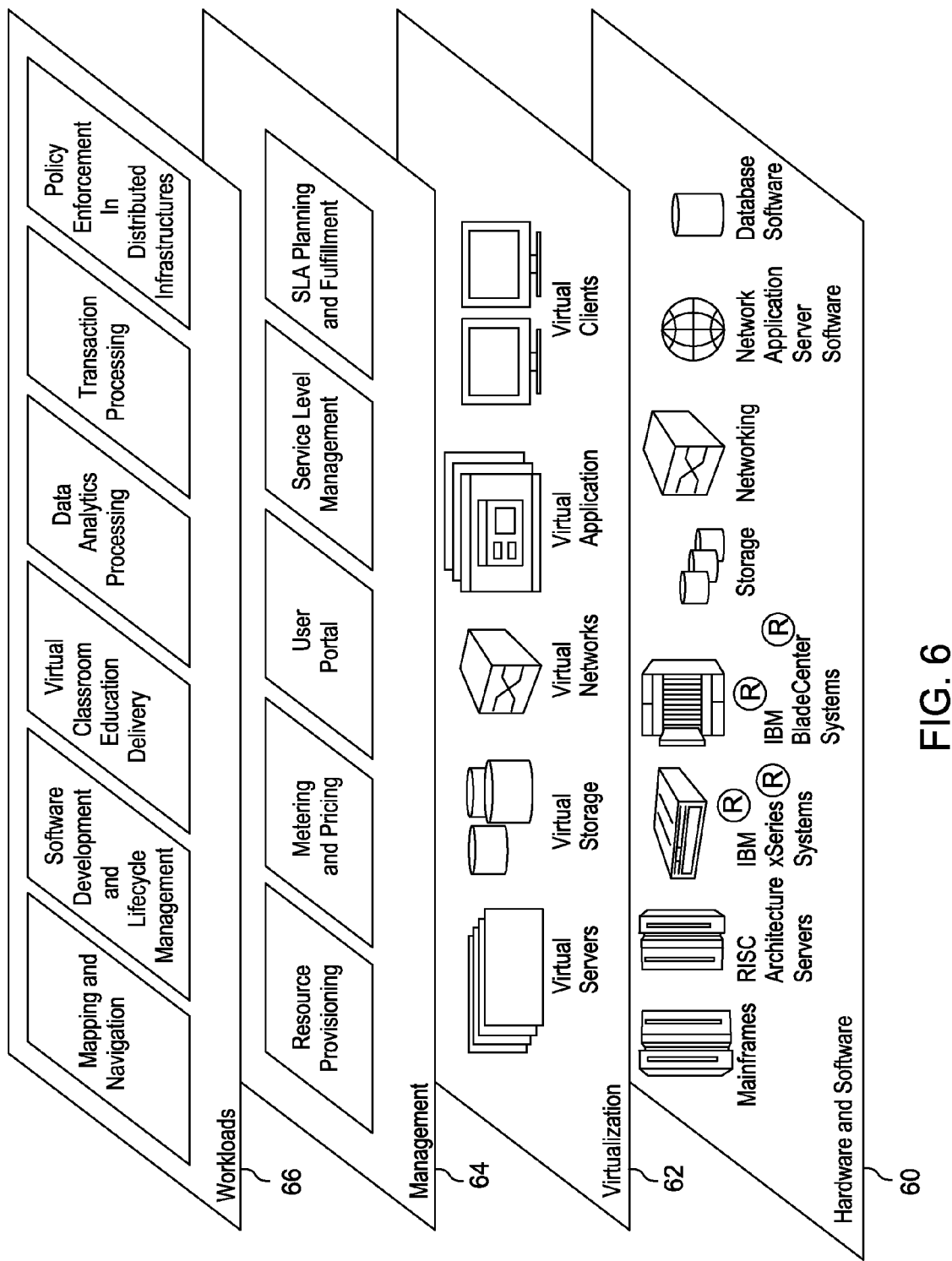
FIG. 6 depicts abstraction model layers, according to one embodiment disclosed herein.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and policy enforcement in distributed processing infrastructures.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving, by a name node, a request to process a client workload on a subset of a plurality of data nodes in a distributed computing environment, wherein the name node stores a file system index reflecting files stored on the plurality of data nodes as part of a distributed file system of the distributed computing environment;
retrieving, by the name node, a set of requirements for processing the client workload;
analyzing, by the name node, the retrieved set of requirements and nodal data describing each of the data nodes, to select, a first data node of the plurality of data nodes as a delegation target to process at least a portion of the client workload, the first data node being selected upon determining: (i) the first data node has a level of resource utilization not exceeding a maximum delegation threshold, and (ii) the nodal data of the first data node satisfies a greater count of the set of requirements than the nodal data of a second data node of the plurality of data nodes, wherein the set of requirements and the nodal data are encrypted and stored on the name node;
delegating the requested processing of the client workload to the delegation target; and
updating the nodal data to reflect the delegation of the client workload to the delegation target, wherein each of the data nodes does not include nodal data identifying other data nodes.

2. The computer-implemented method of claim 1, wherein the set of requirements is specified by a user in a service level agreement and comprises: (i) a data volume requirement, (ii) a security requirement, (iii) a privacy requirement, (iv) a redundancy requirement, (v) a disaster recovery requirement, and (vi) a legal requirement.

3. The computer-implemented method of claim 2, wherein the nodal data comprises: (i) a data node security attribute, (ii) a data node hardware attribute, (iii) a geographical location of the data node, (iv) a data node organizational information attribute, (v) a level of utilization of one or more resources of the data node, and (vi) a data node disaster recovery attribute.

4. The computer-implemented method of claim 3, further comprising computing a suitability score for each data node, wherein the suitability score for a given data node is higher if the nodal data of the given data node allows the given data node to satisfy a greater count of the set of requirements, wherein the first data node is selected as the delegation target upon determining the suitability score of the first data node is greater than the suitability score of the second data node.

5. The computer-implemented method of claim 4, wherein the name node is not configured to be a delegation target, wherein each of the data nodes is not configured to retrieve the nodal data of any other data node.

6. The computer-implemented method of claim 5, wherein the set of requirements is at least partially stored in a data policy comprising at least one of: (i) a data retention policy, (ii) a data security policy, (iii) a data privacy policy, (iv) a performance policy, (v) a disaster recovery policy, and (vi) an infrastructure sharing policy.

7. A method, comprising:
  receiving, by a name node, a request to process a client workload on a subset of a plurality of data nodes in a distributed computing environment;
  retrieving, by the name node from a service level agreement, a set of requirements for processing the client workload, wherein the set of requirements comprise: (i) a data volume requirement, (ii) a security requirement, (iii) a privacy requirement, (iv) a redundancy requirement, (v) a disaster recovery requirement, and (vi) a legal requirement;
  computing, by the name node, a suitability score for each data node, wherein the suitability score for each data node is based on a count of the set of requirements satisfied by the respective nodal data of each data node, wherein the nodal data for each data node comprises: (i) a data node security attribute, (ii) a data node hardware attribute, (iii) a geographical location of the data node, (iv) a data node organizational information attribute, (v) a level of utilization of one or more resources of the respective data node, and (vi) a data node disaster recovery attribute; and
  selecting, by the name node, a first data node of the plurality of data nodes as a delegation target to process at least a portion of the client workload upon determining the suitability score of the first data node is greater than the suitability score of a second data node of the plurality of data nodes, wherein the set of requirements and the nodal data are encrypted and stored on the name node.

8. The method of claim 7, wherein a plurality of secondary name nodes provide redundancy and disaster recovery for the name node, wherein each of the data nodes does not include data identifying other data nodes, the method further comprising:
  delegating the requested processing of the client workload to the delegation target; and
  updating the nodal data to reflect the delegation of the client workload to the delegation target.

9. The computer-implemented method of claim 8, wherein the first data node is selected upon determining that the first data node has a level of resource utilization not exceeding a maximum delegation threshold, wherein the name node stores a file system index reflecting files stored on the plurality of data nodes as part of a distributed file system of the distributed computing environment.

* * * * *